June 6, 1933.  F. E. PAYNE ET AL  1,912,462
PACKING
Filed March 23, 1931
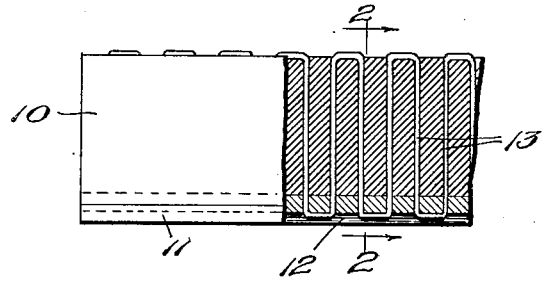
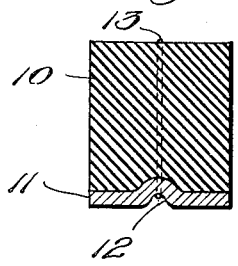
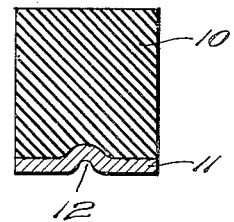
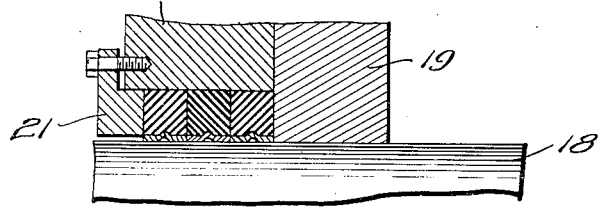
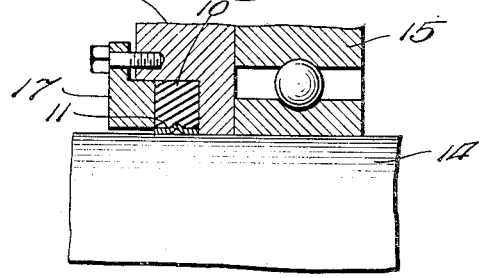
Inventors:
Frank E. Payne
Martin M. Cody and
Edgar G. Howland.
By Rector, Hibben, Davis & Macauley
Attys Patented June 6, 1933

1,912,462

UNITED STATES PATENT OFFICE

FRANK E. PAYNE, MARTIN M. CODY, AND EDGAR G. HOWLAND, OF CHICAGO, ILLINOIS, ASSIGNORS TO CRANE PACKING COMPANY, OF CHICAGO, ILLINOIS, A CORPORATION OF ILLINOIS

PACKING

Application filed March 23, 1931. Serial No. 524,660.

Our invention relates to packing and is primarily concerned with devices of this nature which may be manufactured in flexible lengths and cut to fit any particular operating condition.

One object of our invention is to devise a flexible packing having a sealing face and a resilient backing therefor which is deformed under the pressure of the gland in the stuffing box, or otherwise, to cause a close contact of the sealing face with the part to be sealed.

A further object is to provide a packing of the character indicated having a metallic sealing face which may be formed of lead, copper or generally a non-scoring metal which further possesses the property of making a tight seal with shafts, rods and rotating or reciprocating parts in general, and particularly under conditions requiring the maintenance of an adequate seal against pressure.

A further object is to devise a packing having a flexible, resilient backing and a metallic sealing face which has formed therein a groove that collects the fluid which it is desired to seal, thereby utilizing the latter to improve the sealing capacity of the packing as a whole.

A further object is to provide a means of securing the parts of the packing together, as by stitching or vulcanizing, the stitches, if this method of attachment is used, being preferably located along and in the sealing groove for the purpose of spacing the same from the moving part which the packing encircles and so avoiding wear and disruption of the attaching stitches.

These and further objects of our invention will be set forth in the following specification, reference being had to the accompanying drawing, and the novel means by which said objects are effectuated will be definitely pointed out in the claims.

In the drawing:

Figure 1 is an elevation, partly in section, of our improved packing as the same appears when viewed from the side thereof.

Fig. 2 is a section along the line 2—2 in Fig. 1, looking in the direction of the arrows, and showing generally the relation which exists between the thicknesses of the sealing and backing strips of the packing.

Fig. 3 is a view similar to Fig. 2, but showing a modified arrangement of securing the sealing and backing strips.

Fig. 4 is an elevation, partly in section, illustrating a typical operating condition in which our improved packing may be employed, the packing being shown in sealing relation to a shaft which is rotatably mounted in a bearing.

Fig. 5 is a view, similar to Fig. 4, but showing the use of a plurality of packing rings, as for sealing a reciprocating rod.

Referring to the drawing, our improved packing consists generally of a backing strip 10 which may be formed of rubber, flax, asbestos, or generally any non-metallic material which possesses the property of resiliency to some degree, and a sealing, or facing strip 11 which may be composed of metals such as lead, copper, or generally any metal which is softer than that which composes the part with which the packing may be used, or the sealing strip may be composed of a non-metallic, non-scoring material such as bakelite, fibre or leather.

The strips 10 and 11 may have any convenient width, but in thickness, this dimension of the strip 10 will be several times greater than that of the strip 11, with the latter having such a measure of thickness as will not interfere with its capacity for being rolled into a ring form. Figs. 1 and 2 illustrate one method of attaching the strips 10 and 11 and in accomplishing the results shown, the two strips are placed in superimposed relation to thereby establish the major thickness of the packing and afterwards, a groove 12 is rolled into the face of the strip 11, intermediate the sides thereof, and extending the length of the strip. The formation of this groove causes a projection of the central portion of the strip 11 into the body of the strip 10, as shown clearly in Fig. 2. After forming the groove 12, the two strips may be positively secured together by stitches, as indicated generally by the stitches 13, said stitches extending completely through the thickness of the packing with the portions thereof which project through the strip 11 being rested in the bottom of the groove 12 for a purpose hereinafter explained.

In Fig. 3 is shown a further method of attaching the strips 10 and 11, the stitches in this instance being omitted, and connection being effected by vulcanizing, or otherwise causing an adhesion between the contacting surfaces of the strips 10 and 11.

One particular application of our improved packing is shown diagrammatically in Fig. 4, in which the numeral 14 represents a shaft which is rotatably supported in a bearing 15 and, where the conditions of operation are such, that it is necessary to force lubricant into said bearing under pressure. As it is important to prevent loss of this lubricant from the bearing 15 along the shaft 14 by seepage, the same may be adequately accomplished by placing a length of our improved packing in a stuffing box 16 which is provided with the usual gland 17. The gland 17 contacts only with the backing strip 10 of the packing and when pressure is applied to said strip, it will be obvious that the latter will tend to move in directions laterally of the gland and specifically a direction in which the sealing strip 11 will be caused to contact closely with the periphery of the shaft 14. The resilient nature of the strip 10 will effect substantially a uniform pressure over the entire area of the sealing strip 11, so that the latter will bear uniformly throughout its entire width on the shaft 14, with manifest improvement in its sealing capacity, as well as a maintenance of the life of the packing over a greater period by reason of uniformity in wear. The provision of the groove 12 in the strip 11 assists in establishing the desired seal, for lubricating oil from the bearing 15 tends to collect in this groove and acts as a self-sealing agent in respect of other oil which may be seeping along the shaft 14.

The use of a metallic sealing strip further possesses the important advantage of providing a non-scoring face for the packing, the strip 11 serving substantially as a bearing, so far as the nature of its frictional contact with the shaft is concerned, although, of course, not sustaining any of the weight of the shaft. If the strips 10 and 11 are attached together by means of the stitching 13, it will be apparent that, by locating such stitches in and along the line of the groove 12, the stitches are effectively spaced from the periphery of the shaft 14 and are, therefore, not subjected to wear.

In Fig. 5 is diagrammatically illustrated an application of our improved packing to a reciprocating rod 18 which is carried in a bearing 19. Under these conditions, a plurality of rings are mounted in a stuffing box 20 and compressed by the usual gland 21.

While we have shown one set of elements and combinations thereof for effectuating our improved packing, it will be understood that the same is intended for the purpose of illustration only and in no wise to restrict our article to the exact forms and structures shown, for many changes may be made therein without departing from the spirit of our invention.

We claim:

1. Packing comprising a flexible sealing strip having a groove running lengthwise thereof, a flexible backing strip, the formation of said groove causing the adjacent portion of said sealing strip to extend into the body of said backing strip, and stitching securing said strips together, portions of said stitching being located in said groove.

2. Packing comprising a flexible backing strip, a flexible sealing strip, and stitching securing said strips together, said stitching being offset from the wearing face of said sealing strip.

3. Packing comprising a flexible backing strip, a flexible sealing strip, and continuous stitching securing said strips together, those portions of said stitching which are looped through said sealing strip lying in grooves to thereby offset said stitching portions from the wearing face of said sealing strip.

4. Packing comprising a flexible backing strip, a flexible sealing strip, and stitches securing said strips together, those portions of said stitches which are looped through said sealing strip lying in grooves to thereby offset said stitch portions from the wearing face of said sealing strip.

In testimony whereof, we have subscribed our names.

FRANK E. PAYNE.
MARTIN M. CODY.
EDGAR G. HOWLAND.